United States Patent [19]

Saito

[11] Patent Number: 5,183,234
[45] Date of Patent: Feb. 2, 1993

[54] SEAT SLIDE DEVICE

[75] Inventor: Seishiro Saito, Akishima, Japan

[73] Assignee: Tachi-S Co., Ltd., Akishima, Japan

[21] Appl. No.: 794,385

[22] Filed: Nov. 19, 1991

[51] Int. Cl.⁵ .......................................... F16M 13/00
[52] U.S. Cl. ................................................. 248/430
[58] Field of Search ............... 248/430, 429, 424, 419; 296/65.1; 384/47

[56] References Cited

U.S. PATENT DOCUMENTS

| | | | |
|---|---|---|---|
| 4,811,925 | 3/1989 | Fujita et al. | 296/65.1 X |
| 4,941,637 | 7/1990 | Pipon | 248/430 |
| 5,048,886 | 9/1991 | Ito et al. | 248/430 X |
| 5,076,530 | 12/1991 | Dove et al. | 248/430 |

Primary Examiner—Ramon O. Ramirez
Attorney, Agent, or Firm—Oldham, Oldham & Wilson Co.

[57] ABSTRACT

A seat slide device for fore-and-aft adjustment of a seat, including upper and lower rail, the former being fitted slidably within the latter, wherein a spacer member of an elastic material is interposed between a slide portion of the upper rail and an upper portion of the lower rail, so as to prevent a wobbling of the upper rail relative to the lower rail as well as to suppress a contact noise therebetween.

6 Claims, 6 Drawing Sheets

SEAT SLIDE DEVICE

BACKGROUND OF THE INVENTION

1. Field of the Invention

The present invention relates to a seat slide device which supports a seat in order that the seat is slidable therealong forwardly and backwardly and permits for adjusting such forward and backward movement of the seat.

2. Description of Prior Art

A seat for use in an automobile or the like is in most instances slidable for adjustment of its position in the forward and backward directions by means of a seat slide device.

Reference is made to FIGS. 1(A) and 1(B) showing an example of conventional seat slide device (210) which is comprised of a lower rail (214) fixed on a floor of an automobile (not shown) and an upper rail (218) fitted in the lower rail (214) slidably via steel balls (216).

The two bifurcated ends of the upper rail (210) are each formed with an inwardly curved part (228), and both lateral walls of the lower rail (214) are each formed with an outwardly curved part (222). Those two inwardly and outwardly curved parts (228) (222) cooperate to retain each of the balls (216) therein. Generally, the steel balls (216) are so arranged that one of them is disposed at a forward portion of the rails and another of them at a backward portion thereof with a certain space therebetween. The balls (216) of course serves to facilitate the slidability of the upper rail (218) along the lower rail (214). As shown, in this slide rail device, the lower rail (214) is bent it its two upper end portions into an inverted U-shaped section (234), while the upper rail (210) is formed with a horizontal section (230). This arrangement prevents separation of the upper rail (210) from the lower one (214), because, if an upward excessively great force is applied to the upper rail (210) through a seat belt in a collision or sudden deceleration case, the upper rail (210) is forced upward away from the lower rail (214), but the horizontal section (230) of the upper rail (210) contacts the downwardly projecting edge of the inverted U-shaped section (234) as shown in FIG. 1(B), thereby preventing removal of the upper rail (210) from the lower one (214).

However, as apparent from FIG. 1(A), in this conventional slide rail, a spacing (L) is given between the inverted U-shaped sections (234) and horizontal section (230), as a result of which, it has been found defective in that (i) the upper rail (210) is merely supported via the balls (216) to the lower rail (214), which makes loose the slidable connection between the inwardly curved part (228) of upper rail (210) and outwardly curved part (222) of lower rail (22) and will emit a noise due to the wobbling of the two rails, (ii) such spacing (L) results inevitably in deformation of the inwardly curved part (228) of upper rail (210) as in FIG. 1(B), and thus it is impossible to avoid damage to the slide rail per se, and (iii) In attempt to avoid such slide rail deformation, one can consider forming longer the downwardly projected edges of lower rail inverted-U-shaped section (234) close to the horizontal section (230) as indicated by phantom line in FIG. 1(A); however, even a slight vibration or rolling of the automobile will easily cause such downwardly projected edges to be contacted with the horizontal section (230), thus resulting in producing an unpleasant noise there.

SUMMARY OF THE INVENTION

In view of the above-stated shortcoming, it is thus a purpose of the present invention to provide an improved seat slide device which prevents wobbling of an upper rail relative to a lower rail.

To achieve the purpose, according to the present invention, there is provided a spacer member between a horizontal part of the upper rail slide portion and an upper end portion of the lower rail. The spacer member serves to prevent the upper rail from vertically wobbling or moving against the lower rail.

It is another purpose of the present invention to suppress an unpleasant noise which is to be emitted between the upper and lower rails.

To this end, the spacer member is made of an elastic material to absorb the impact and incidential noise which may be occurred from contact between the upper and lower rails.

In one aspect of the invention, the spacer member is so formed to cover the upper and both lateral sides of the slide portion of the upper rail within the lower rail, thereby extending the noise and wobbling suppression effect against both vertical and horizontal forces applied to the slide rails.

DETAILED DESCRIPTION OF PREFERRED EMBODIMENTS OF THE INVENTION

Figure 1A:
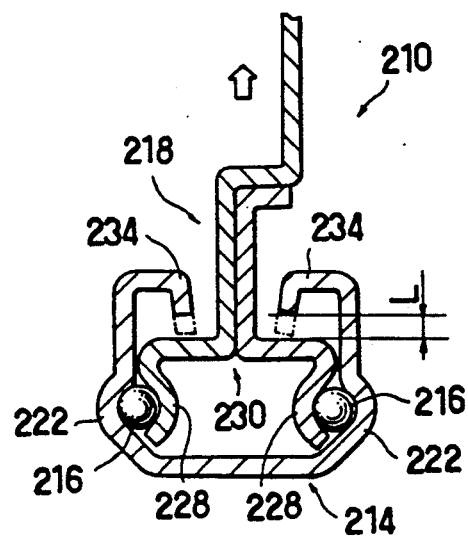
FIGS. 1(A) and 1(B) are sectional views of a conventional slide, rail device, showing its disadvantageous aspect.
Figure 1B:
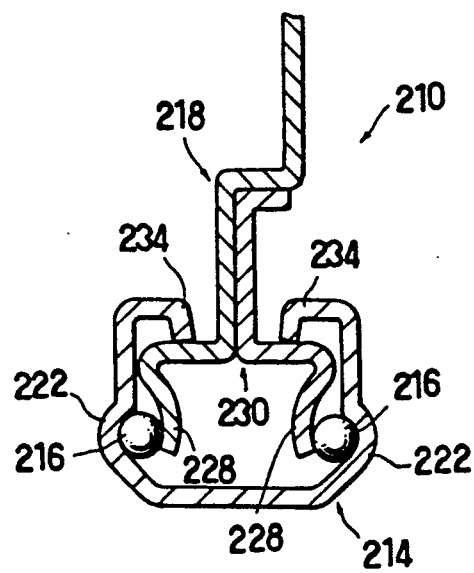
Figure 2:
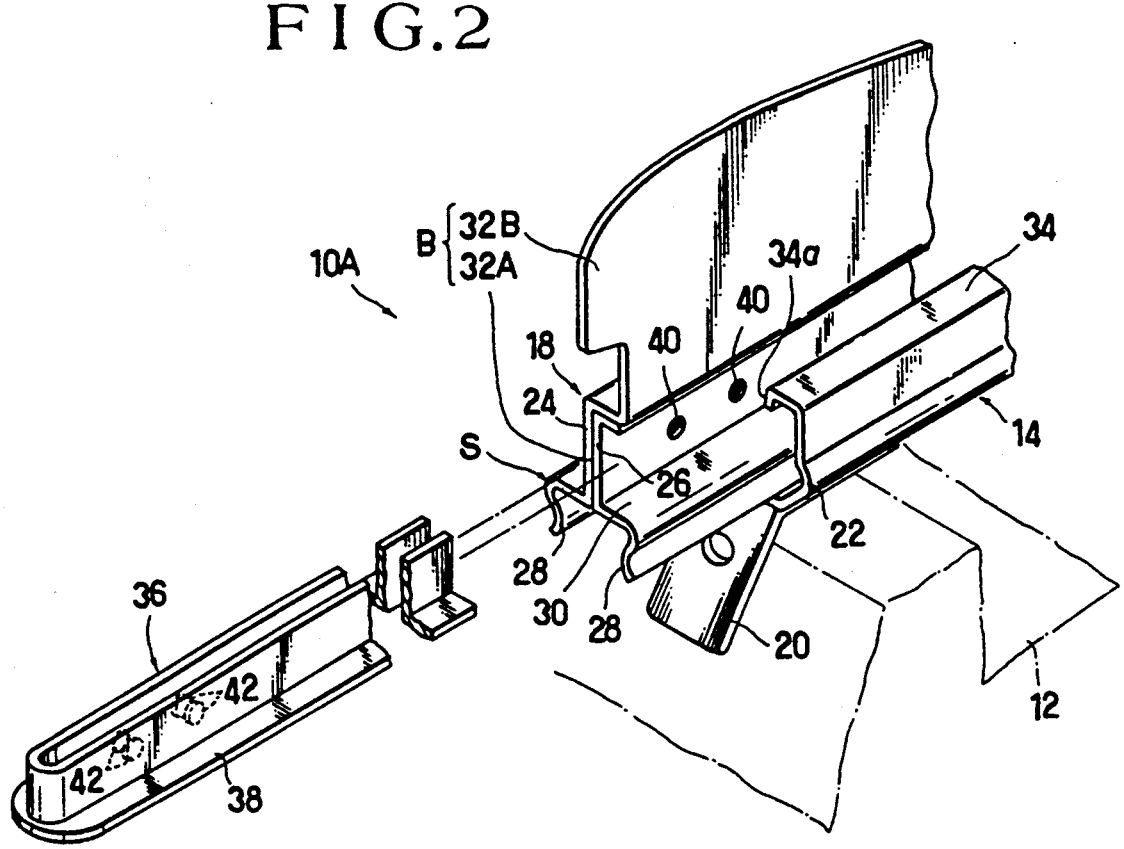
FIG. 2 is a partly broken perspective view of a principal part of a first embodiment in accordance with the present invention.
Figure 3:
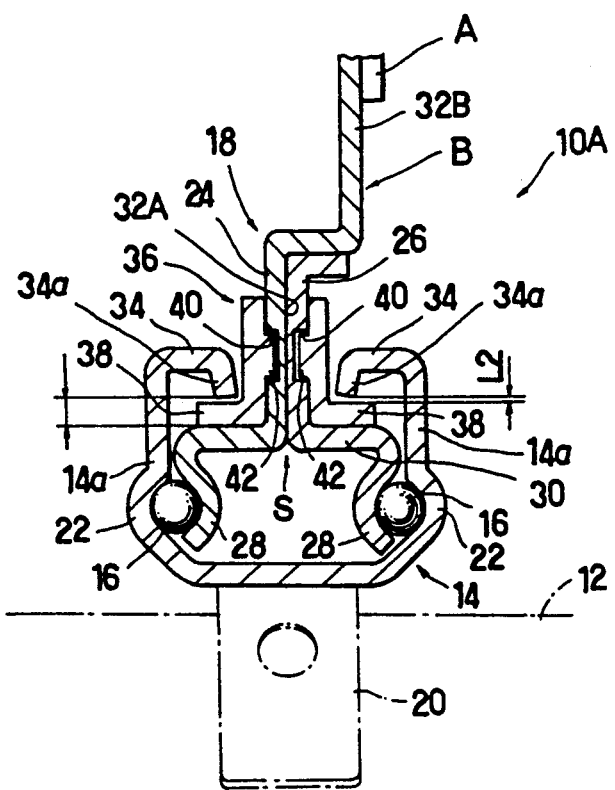
FIG. 3 is a sectional view of the first embodiment of slide rails as in FIG. 2.
Figure 4:
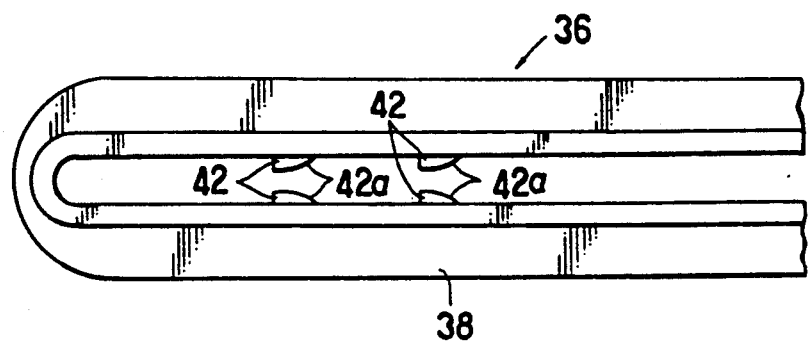
FIG. 4 is a partly broken plan view of a spacer member in the first embodiment.

FIGS. 2 to 4 illustrate a first embodiment of a seat slide device in accordance with the present invention, which is generally designated by (10A). The seat slide device (10A) includes a lower rail (14) fixed to a floor (12) and an upper rail (18) which is slidably fitted in the lower rail (14) via steel balls (16). A seat (not shown) is mounted on the upper rail (18). Although not clearly shown, leg brackets (20) are fixed at the forward and backward ends of the lower rail (14). The leg brackets (20) are fixed on the floor (12) by means of securing screws, thereby fixing the lower rail (14) on the floor (12). As seen from FIG. 2, the lower rail (14) is formed by bending one unitary sheet of metallic plate into a generally U-shaped configuration having an upwardly oriented opened area to thereby form a pair of upper flange sections (34)(34) in an inverted U shape in section which face towards each other. The upper flange sections (34)(34) are each formed with a downwardly projected end (34a). Both vertical lateral walls (14a) of the lower rail (14) are formed with an outwardly curved part (22).

The upper rail (18) is formed by welding together a base plate material (24) and auxiliary plate material (26) into a configuration having a slide section (S) to be slidable within the lower rail (14) and a bracket disposed at the center of the slide section (S) section (B) extending upwardly through the opened area of the lower rail (14). The slide section (S) comprises a horizontal part (30) extending symmetrically relative to a center line and a pair of inwardly curved vertical wall parts (28)(28) at both ends of such horizontal part (30). The bracket section (B) comprises upstanding parts (32B), integral with the base plate material (24).

The steel balls (16) are each embracingly held between the respective outwardly and inwardly curved parts (22)(28) of lower and upper rails (14)(18). Though not clearly shown, the balls (16) are arranged in the slide rail such that some of them are disposed at a forward portion of the rails while the other of them are disposed at a backward portion thereof, with a given distance therebetween. Hence, the balls (16) act to resist both vertical and horizontal loads applied to the lower and upper rails (14)(18) and facilitate the slidability of the upper rail (18) along the lower one (14).

In the present embodiment, there is provided a spacer member (36) of soft elastic material such as a synthetic resin, between the upper and lower rails (18)(14). The spacer member (36) has a U-shaped configuration as shown in FIG. 2 as a whole, and includes an outwardly extending horizontal flange portion (38) and a vertical wall portion continuously formed from that flange portion (38). The flange portion (38) is so designed to be interposed between the downwardly projected end (34a) of lower rail (14) and horizontal part (30) of upper rail (18). Thus, as best seen from FIG. 3, the spacer member (36) assumes a pair of spaced-apart L-shaped walls in section so as to lie upon the lower part of standing bracket section (B) as well as upon the horizontal part (30) of slide section (S). The spacer member (36) may be secured to the lower standing or vertical part of upper rail (18) by inserting the latter into and along the elongated opened portion of the spacer member (36), as can be seen in FIG. 2.

The flange portion (38) of spacer member (36) is so formed as to have a thickness or height which amounts with the horizontal slide part (30) of upper rail (18) to a level leaving a relatively slight clearance (L2) between the flange portion (38) and downwardly projected end (34a) of lower rail (14), as best shown in FIG. 3. The clearance (L2) is defined such as to allow movement of the spacer member (36) along with the sliding movement of the upper rail (18) within the lower rail (14).

Referring again to FIGS. 2 and 3, it is seen that both standing parts (32A(32B) are each formed at its outer wall with two spaced-apart recessed parts (40)(40), and that , correspondingly to those respective recessed parts, two spaced protrusions (42)(24) are formed in the inner wall of each lateral section of spacer member (36). With regard to the protrusions (42)(42), more specifically, FIG. 4 shows their arrangements in the spacer member (36); namely, two spaced-apart sets of protrusions (42) are each formed at the respective two opposed inner walls of spacer member (36), and each of the protrusions (42) has an incline or curved part (42a) formed at a side oriented towards the open end of the spacer member (36). As shown, the protrusions (42) are disposed in the neighborhood of the U-turned end part of spacer member (36). With this construction, as seen from FIG. 3, the protrusions (42) are click engaged into the mating recessed parts (40), respectively, so that the spacer member (36) are securely mounted upon the upper rail (18). It is noted that the length of spacer member (36) extends over to a sliding limit of the upper rail (18) where the upper rail (18) is still fitted within the lower rail (14).

In assembling the upper and lower rails (18)(14) the steps of securing the foregoing spacer member (36) to the upper rail (18) consist in directing the open end of the same member (36) towards both forward ends of upper and lower rails (18)(14), then advancing the spacer member open area along the vertical part of upper rail (18), with the spacer member flange portion (38) sliding between the upper rail horizontal part (30) and lower rail downwardly projected end (34a). The protrusions (42) are then elastically deformed from its inclined part (42a) and engaged into the recessed parts (40), respectively, which firmly secures the spacer member (36) to the upper rail (18), thereby preventing the spacer member (36) against symmetrical opening or separation of its both lateral sections from a center line of the upper rail (18). Such possible separation of spacer member (36) can be further prevented by the two opposed upper flange sections (34)(34) of lower rail (14) which are situated adjacently on the opposite sides of the spacer member (36). This also advantageously prevents disengagement of the protrusions (42) from their respective recessed parts (40), hence assuring an integral relation between the spacer member (36) and upper rail (18) for their concurrent sliding movement along the lower rail (14).

Accordingly, by virtue of the elastic spacer member (36) of resin material being interposed between the lower-rail upper flange section (34) and upper-rail horizontal part (30), the upper rail (18) is substantially prevented against upward movement from the lower rail (14) due to presence of the flange portion (34) of spacer member (36). Thus, the slight vertical repeated movements of upper rail (18) caused by vibration or rolling of the running automobile are absorbed elastically by such flange portion (38), of spacer member (36), to thereby positively prevent wobbling of the upper rail (18) within the lower rail (14). This is because the upper rail (18) is to be contacted with the spacer member (36), rather than being directly contacted with the lower rail (14). Such arrangement for allowing contact between the upper rail and spacer member is also advantageous in suppressing an unpleasant metallic noise between the upper and lower rails (18)(14). Furthermore, in particular, when an excessive upward force is applied to the upper rail (18) in case of a collision or sudden deceleration, the spacer member (36) serves to block the upward displacement of the horizontal part (30) of upper rail (18) to thereby prevent deformation of the inwardly curved parts (28) as well as that horizontal part (30) of the upper rail (18), as found in the prior art. Those effects will help to ease the psychological state of an occupant on the seat without feeling such wobbling or noise problem in the slide rails and allow him or her to concentrate driving of the car with care of safety.

The spacer member (36) may be formed into a pair of separated L-shaped elements similar in section to the foregoing U-shaped integral configuration, the recessed parts (40) may be formed as throughholes, and the material of spacer member (36) may be a hard rubber material, a foam resin material, or a light metal such as aluminium.

Figure 5:
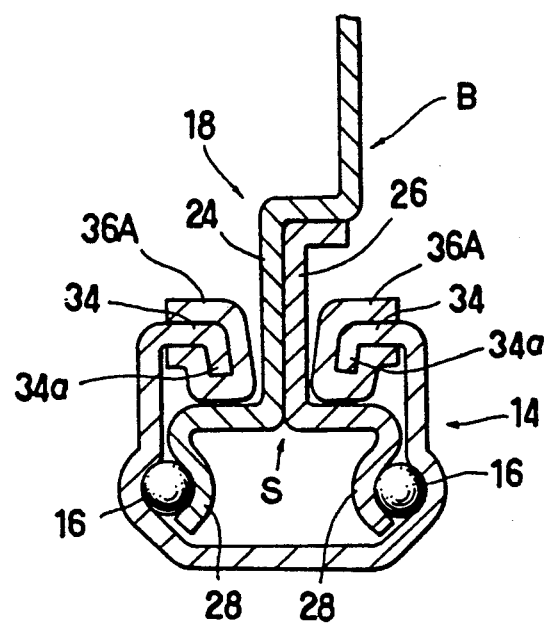
FIG. 5 is a sectional view of a slide rail having another mode spacer member.

FIG. 5 shows a second embodiment of the invention wherein another spacer member (36A) is employed. This member (36A) is so formed as to cover a part of upper flange portions (34) of lower rail (14) as well as the downwardly projected ends (34a), as shown. According thereto, there is eliminated such wobbling and noise problem caused between the upper and lower rails (18)(14).

FIGS. 6 to 9 show a third embodiment of the invention a seat slide device (10B) is generally similiar to that (10A) of the above-mentioned first emboidment, comprising upper and lower rails (18)(14). Like desigations herein refer to like ones used in the first embodiment.

In this third embodiment, a pair of spaced-apart spacer members (136)(136) are interposed between the upper and lower rails (18)(14). Each of them comprises a horizontal section (136) and a vertical section terminating in a ball spacer section (136A). The horizontal section (136), as similar to the flange section (38) of the foregoing first-embodiment spacer member (36), lies on the horizontal part (30) of upper rail (18), functioning to provide a clearance (L2) between the horizontal section (136) and lower rail end (34a), producing the same effects as in the first embodiment. The ball spacer section (136A) is formed in a size smaller than the spacing defined between the inwardly and outwardly curved parts (28) (22) respectively of upper and lower rails (18)(14), as best shown in FIG. 9, and further formed with a cut-away part (136A-1) along its longitudinal direction for the purpose to be set forth later.

Figure 6:
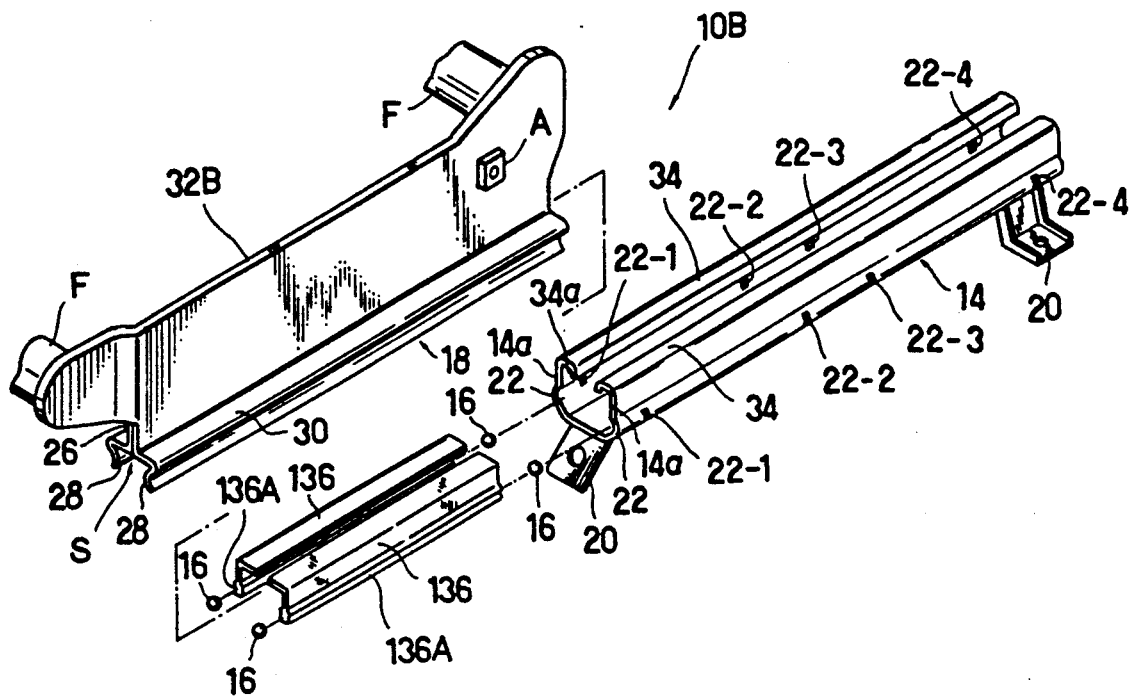
FIG. 6 is a partly broken perspective view of a second embodiment of the invention.
Figure 7:
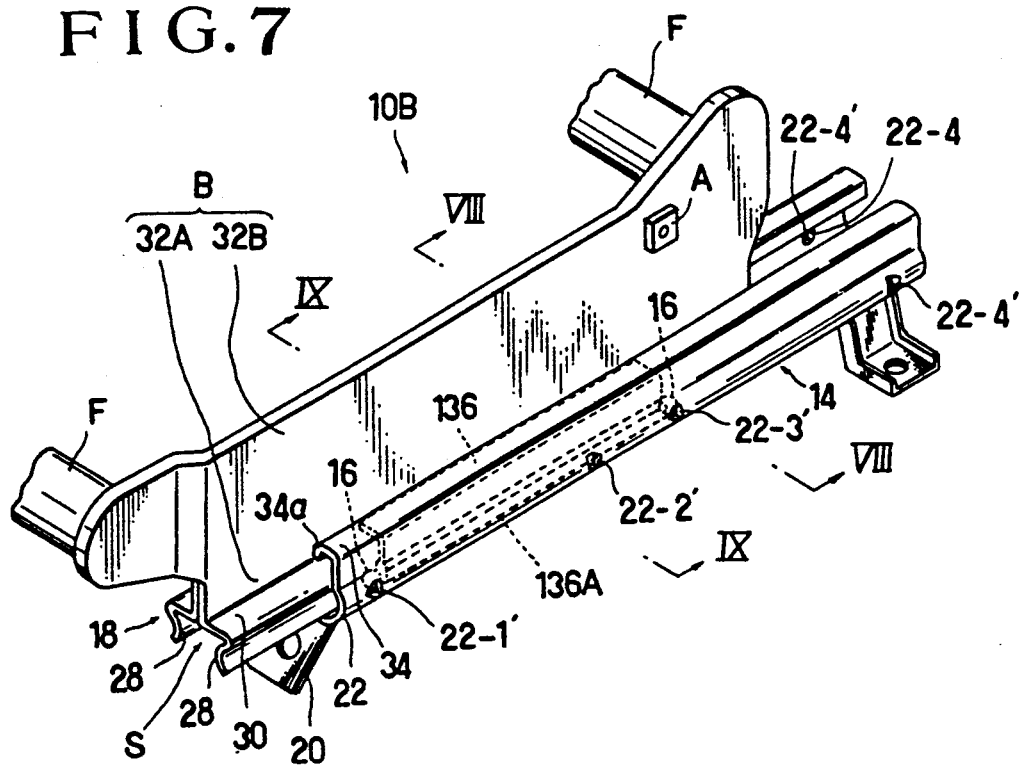
FIG. 7 is a partly broken perspective view showing the assembled state of the device in FIG. 6.
Figure 8:
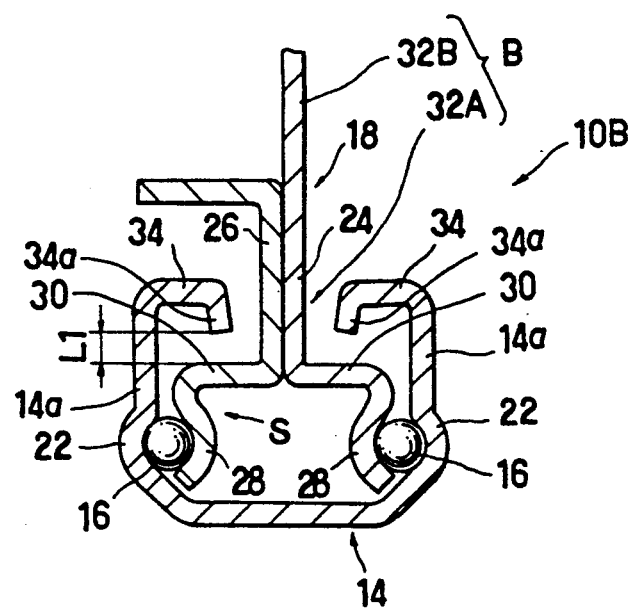
FIG. 8 is a sectional view taken along the line VIII—VIII in FIG. 7.

Designations (22-1)(22-2) denote a pair of slits formed at the outer wall of outwardly curved part (22), as best shown in FIG. 6, and those slits (22-1)(22-2) are each formed into a detent lug (22-1') or (22-2') by press working the corresponding part of the upper rail (14), the detent lug projecting inwardly of such curved part (22) at a degree to contact with and stop the ball (16). In addition to the first set of two detent lugs (22-1')(22-2'), which are defined at a forward half section of the lower rail (14), another second set of two detent lugs (22-3')(22-4') are arranged at a rearward half section thereof in the same manner as those (22-1') (22-2'), which can best be seen from FIG. 9.

Two balls (16)(16) are spaced apart from each other by the ball spacer section (136A), as understandable from FIG. 6. For that purpose, the ball spacer section (136A) is of a length which determines a distance between the two balls (16), and not only close to a distance between first combination of detent lugs (22-1')(22-3') but also close to that between second combination of detent lugs (22-2') (22-4'). It is to be therefore understood that the balls (16) are rollable without coming together or with a given distance therebetween and limiting their forward and backward rolling ranges. The spacer members (136) are allowed to be moved together with the upper rail (18), irrespective of the foregoing detent lugs, because the cut-away parts (136A.1) serve as escape means for making the spacer members (136) free of contact with those lugs. In this respect, it is noted that the fore-and-aft movement of upper rail (18) causes simultaneous rolling of the balls (16), which in turn simultaneously presses the spacer member (136) in the same direction along the longitudinal direction of the lower rail (14), whereupon both upper rail (18) and spacer member (136) are moved together within the lower rail (14).

Figure 9:
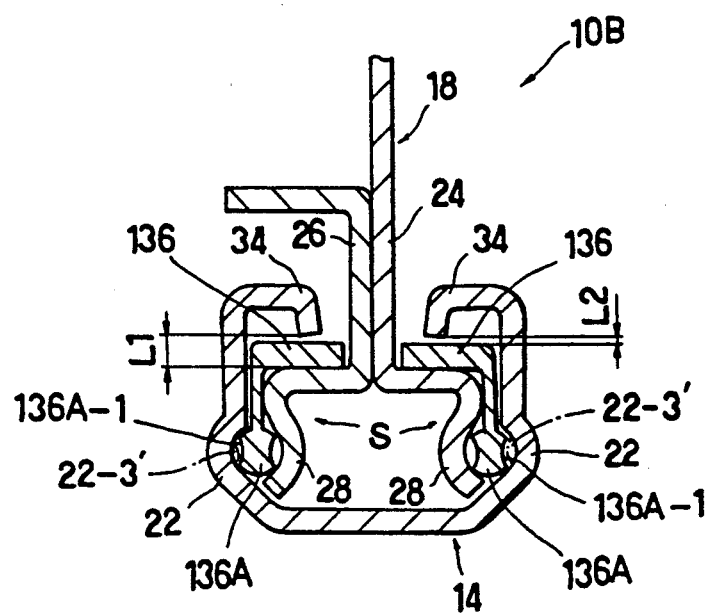
FIG. 9 is a sectional view taken along the line IX—IX in FIG. 7.

In the present third embodiment, it is appreciated that the spacer member (136) generally covers the entirety of slide portion (S) of upper rail (18) with respect to the lower rail (14), thus extending the noise or wobbling suppression effect against both vertical and horizontal forces applied to the slide rail (14)(18), as can be seen from FIG. 9, and further the spacer member (136) per se does not need to be fixed to the slide portion (S) of upper rail (18), which means to simply enable insertion of the same (136) into between the upper and lower rails (18) (14) in the assemblage, thus simplifying the steps involved and making them easier.

Figure 10:
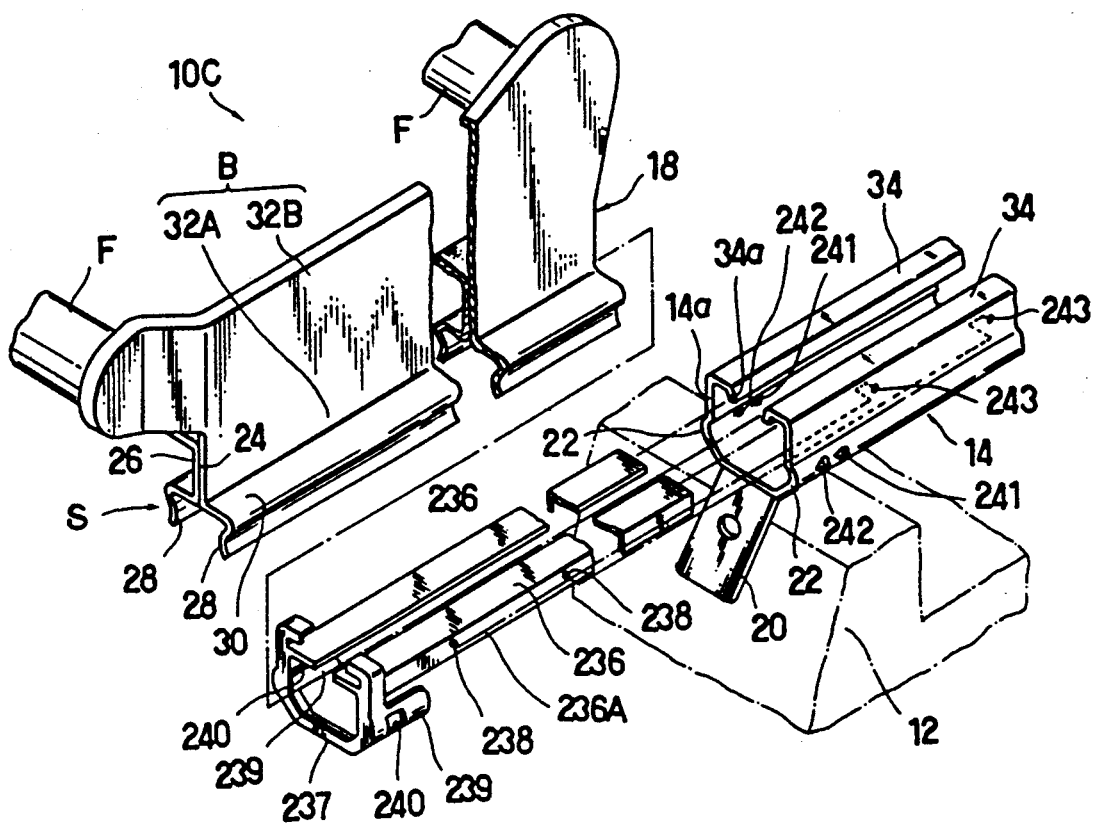
FIG. 10 Is a partly broken perspective view of a third embodiment of the invention.
Figure 11:
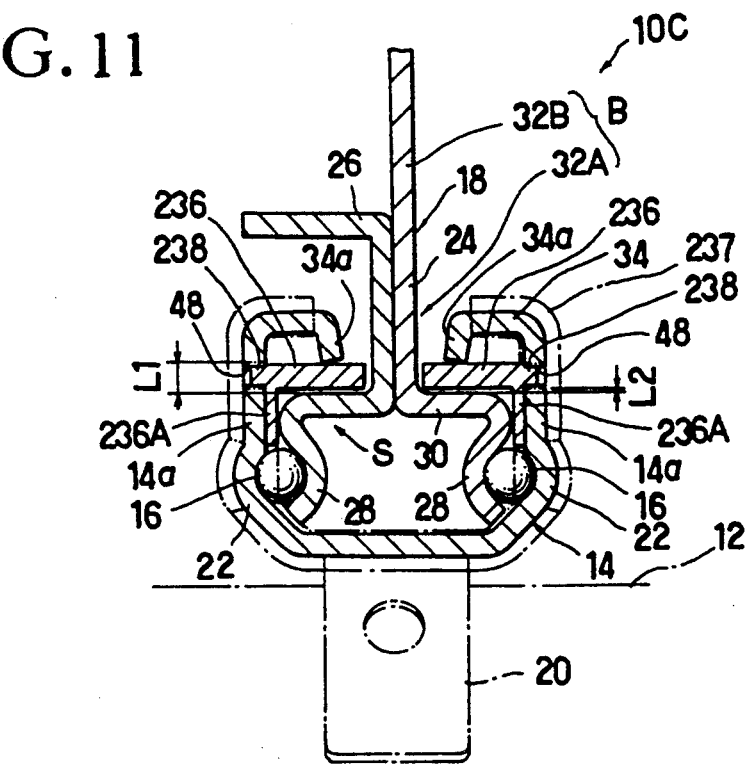
FIG. 11 is a sectional view of the device in FIG. 10.

FIGS. 10 and 11 show a fourth embodiment of the invention, which provides an improvement in the above-described third embodiment. Excepting another mode of spacer member (236), all constituent elements and members are similar to those of the third embodiment, and like designations herein refer to like ones in the third emobdment.

According to the slide device (10C) in this embodiment, similar to the spacer member (136) in the third embodiment, a pair of spaced-apart spacer members (236) are provided, each of which includes a dependent vertical section (238) formed integral with the horizontal body of the spacer member. Fixed integrally to the forward end of spacer members (236), is a protective cap member (237) which is formed in a shape conforming to the sectional shape of lower rail (10), so that the cap member (237) may be fitted over the forward end of lower rail (14) as can be seen in FIG. 10. The cap member (237) has a pair of extensions (239), each extending rearwardly of the spacer member (236) and having an engagement hole (240) into which the first lug (242) formed in the lower rail (14) is to be engaged. The spacer members (236) are each formed at its dependent vertical section (230 with a pair of spaced-apart engagement projections (238) which are to be engaged into the two engagement holes (243) formed at the upper flange portions (34) of lower rail (14). As shown in FIG. 11, it is so arranged that the horizontal parts of spacer member (246) are located at a level leaving a slight clearance (L2) therebelow relative to the horizontal part (30) of upper rail (18).

Designation (241) denotes a detent lug which limits the forward rolling range of balls (16).

With the present fourth embodiment, in addition to the same effects as in the afore-stated embodiments, it is possible to protect a person's foot against injury at the forward end of the slide device.

While having described the present invention as above, it should be understood that the invention is not limited to the illustrated embodiments, but any other modifications, replacements and additions may structurally be possible without departing from the spirits and scopes of the appended claims.

What is claimed is:

1. A seat slide device comprising:
    a lower rail having a generally U-shaped configuration in section, which is opened at its upper part, forming thus an upper opened part and also forming two spaced-apart upper flange portions;
    an upper rail including a slide portion which is fitted in said lower rail in a slidable manner, and a bracket portion which is integrally formed with said slide portion, such that said bracket portion is disposed at the center of said slide portion and extends upwardly through the upper opened part of said lower rail, said slide portion having a horizontal part formed integrally with said bracket portion and having a pair of lateral parts formed downwardly from both ends of said horizontal part;

a ball retaining portion which is defined between a lateral wall of said lower rail and one of said lateral parts of said upper rail slide portion, said ball retaining portion being adapted for retaining at least one steel ball therein; and a spacer member made of a soft, elastic material, said spacer member being interposed between said upper flange portions of said lower rail and said horizontal part of said upper rail slide portion, wherein said upper rail is prevented by said spacer member against vertical wobbling within said lower rail;

wherein said spacer member is of such a formation as to be affixed over both of said horizontal part of said slide portion and bracket portion associated with said upper rail, and wherein said spacer member is formed generally in U-shaped configuration having a peripheral horizontal part and a vertical part standing therefrom, and wherein said spacer member is secured to said upper rail such that said peripheral horizontal part lies on said horizontal part of said upper rail slide portion while said vertical part sandwiches therein said bracket portion of said upper rail.

2. The seat slide device according to claim 1, wherein said upper rail bracket portion is formed with at least one engagement hole, and where said vertical part of said spacer member has at least one engagement projection to be engaged into said engagement hole, wherey the spacer member is firmly secured to said upper rail.

3. A seat slide device comprising:

a lower rail having a generally U-shaped configuration in section, which is opened at its upper part, forming thus an upper opened part and also forming two spaced-apart upper flange portions;

an upper rail including a slide portion which is fitted in said lower rail in a slidable manner, and a bracket portion which is integrally formed with said slide portion, such that said bracket portion is disposed at the center of said slide portion and extends upwardly through the upper opened part of said lower rail, said slide portion having a horizontal part formed integrally with said bracket portion and having a pair of lateral parts formed downwardly from both ends of said horizontal part;

a ball retaining portion which is defined between a lateral wall of said lower rail and one of said lateral parts of said upper rail slide portion, said ball retaining portion being adapted for retaining at least one steel ball therein; and a spacer member made of a soft, elastic material, said spacer member being interposed between said upper flange portions of said lower rail and said horizontal part of said upper rail slide portion, wherein said upper rail is prevented by said spacer member against vertical wobbling within said lower rail;

wherein said spacer member is of such a formation as to be affixed over both of said horizontal part of said slide portion and bracket portion associated with said upper rail, and wherein said spacer member comprises a pair of separate generally inverted L-shaped pieces, each including an upper horizontal part which lies on said horizontal part of said upper rail slide portion and a lower vertical part extending between said lateral part of said upper rail and said lateral wall of said lower rail, and wherein said spacer member is formed at its forward end with a cap-like member which is secured to a forward end part of said lower rail.

4. The seat slide device according to claim 3, wherein said lower rail is formed with an engagement projection, and wherein said spacer is formed with an enagement hole into which is engageed said engagement projection.

5. The seat slide device according to claim 4, wherein said spacer member is made of one selected from materials consisting of a rubber material, metallic material and synthetic resin material.

6. A seat slide device comprising:

a lower rail having a generally U-shaped configuration in section, defining thus an opened portion at its upper part to form an upper opened part, with two upper flange portions being also defined in a spaced-apart relation with each other therein, an upper rail including a slide portion which is fitted in said lower rail in a slidable manner, and a bracket portion which is integrally formed with said slide portion, such that said bracket portion is disposed at the center of said slide portion and extends upwardly through the upper opened part of said lower rail, said slide portion having a horizontal part formed integrally with said bracket portion and having a pair of lateral parts formed downwardly from both ends of said horizontal part;

a ball retaining portion which is defined between a lateral wall of said lower rail and one of said lateral parts of said upper rail slide portion, said ball retaining portion being adapted for retaining at least one steel ball therein; and a spacer member made of a soft, elastic material, said spacer member being formed generally in U-shaped configuration having a peripheral horizontal part and a vertical part standing therefrom, and wherein said spacer member is secured to said upper rail such that said peripheral horizontal part lies on said horizontal part of said upper rail slide portion, while said vertical part thereof sandwiches therein said bracket portion of said upper rail.

* * * * *